(12) United States Patent
Thekkath et al.

(10) Patent No.: US 6,681,283 B1
(45) Date of Patent: Jan. 20, 2004

(54) COHERENT DATA APPARATUS FOR AN ON-CHIP SPLIT TRANSACTION SYSTEM BUS

(75) Inventors: Radhika Thekkath, Palo Alto, CA (US); G. Michael Uhler, Redwood City, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/373,094

(22) Filed: Aug. 12, 1999

(51) Int. Cl.[7] .......................... G06F 13/00; G06F 12/00
(52) U.S. Cl. ........................ 710/305; 711/141
(58) Field of Search ................... 710/305, 110, 710/107, 113, 240, 36; 711/100, 113, 141, 146; 709/200, 209; 370/462

(56) References Cited

U.S. PATENT DOCUMENTS

| | | | |
|---|---|---|---|
| 4,587,609 A | 5/1986 | Boudreau et al. | |
| 4,998,198 A | 3/1991 | Chan | |
| 5,091,846 A | 2/1992 | Sachs et al. | 395/250 |
| 5,255,378 A | 10/1993 | Crawford et al. | |
| 5,347,648 A | * 9/1994 | Stamm et al. | |
| 5,428,753 A | 6/1995 | Kondo et al. | |
| 5,463,762 A | 10/1995 | Morrissey | |
| 5,504,874 A | 4/1996 | Galles et al. | 395/472 |
| 5,525,971 A | 6/1996 | Flynn | |
| 5,579,530 A | 11/1996 | Solomon et al. | |
| 5,581,782 A | 12/1996 | Sarangdhar et al. | 395/800 |
| 5,615,404 A | 3/1997 | Knoll et al. | 395/882 |
| 5,696,976 A | 12/1997 | Nizar et al. | 395/739 |
| 5,724,549 A | * 3/1998 | Selgas et al. | |
| 5,751,975 A | 5/1998 | Gillespie et al. | 395/306 |
| 5,768,612 A | 6/1998 | Nelson | 395/800 |
| 5,778,412 A | 7/1998 | Gafken | 711/5 |
| 5,781,745 A | 7/1998 | Ramelson | |
| 5,787,486 A | 7/1998 | Chin et al. | |
| 5,796,977 A | 8/1998 | Sarangdhar | 395/406 |
| 5,799,203 A | 8/1998 | Lee et al. | |
| 5,802,560 A | * 9/1998 | Joseph et al. | |
| 5,828,865 A | 10/1998 | Bell | 395/500 |
| 5,832,310 A | 11/1998 | Morrissey et al. | |
| 5,859,986 A | 1/1999 | Marenin | |
| 5,892,978 A | 4/1999 | Munguia et al. | |
| 5,918,072 A | 6/1999 | Bhattacharya | |
| 5,996,036 A | 11/1999 | Kelly | |
| 6,034,542 A | * 3/2000 | Ridgeway | |
| 6,035,364 A | 3/2000 | Lambrecht et al. | |
| 6,044,225 A | 3/2000 | Spencer et al. | |
| 6,085,261 A | 7/2000 | McIntyre, Jr. et al. | |
| 6,108,734 A | 8/2000 | Shand | |
| 6,122,690 A | 9/2000 | Nannetti | |
| 6,134,481 A | 10/2000 | Warren | |
| 6,138,176 A | 10/2000 | McDonald et al. | |
| 6,173,349 B1 | 1/2001 | Qureshi et al. | |
| 6,185,637 B1 | 2/2001 | Strongin et al. | |
| 6,301,625 B1 | 10/2001 | McDonald et al. | |
| 6,321,284 B1 | 11/2001 | Shionohara et al. | |

* cited by examiner

Primary Examiner—Gopal C. Ray
(74) Attorney, Agent, or Firm—James W. Huffman

(57) ABSTRACT

A cache coherency system for an on-chip computing bus is provided. The coherency system contains a coherency credit counter within each master device on the on-chip bus for monitoring the resources available on the bus for coherent transactions, a coherency input buffer for storing coherent transactions, and a cache for storing coherent data. The coherency credit counter tracks coherent transactions pending in a memory controller, and delays coherent transactions from being placed on the bus if coherent resources are not available in the memory controller. When resources become available in the memory controller, the memory controller signals the coherency system in each of the master devices. The coherency system is coupled to a split transaction tracking and control to establish transaction ID's for each coherent transaction initiated by its master device, and presents a transaction ID along with an address portion of each coherent transaction.

39 Claims, 9 Drawing Sheets

Timing Diagram for Split Transactions

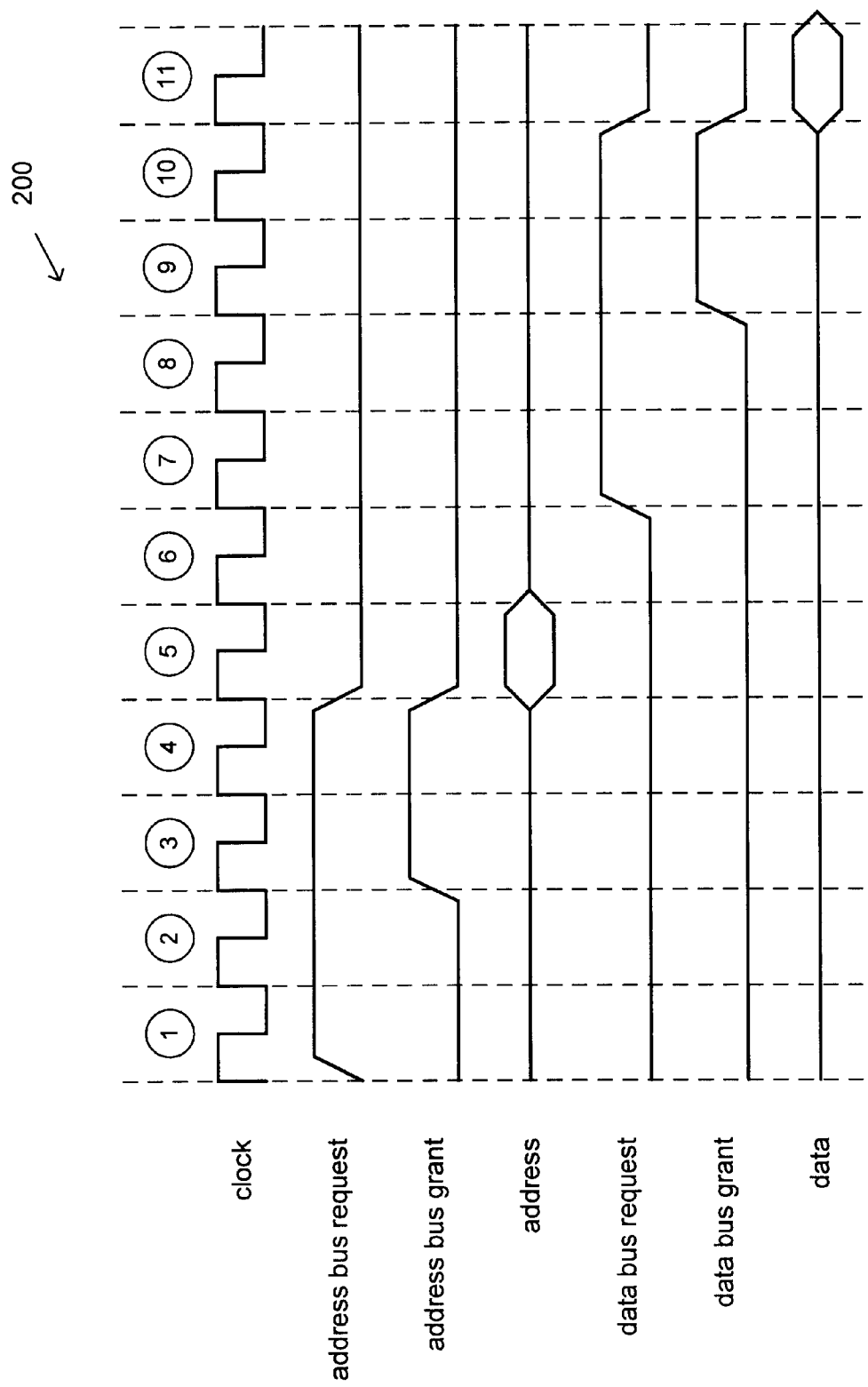

| Source-Destination | Signal Name | Description |
|---|---|---|
| General (2 signals) | Bclk | Bus clock |
| | Breset | Bus reset |
| Master-Address Bus Arbiter (9 signals) | MAA_req | A dedicated reqest signal from every Master to the Address arbiter |
| | MAA_lock | When asserted with a request, this implies a request for two consecutive cycles on the address bus, one read and one write address |
| | MAA_slaveid[2:0] | Indicates to the arbiter the id of the target slave for the current request. Needed for pre-grant flow control |
| | MAA_type[1:0] | Indicates whether operation is read or write or neither. Needed for pre-grant flow control<br>00-Read (non-coherent)<br>01-Write (non-coherent)<br>10-Coherent<br>11-None of the above |
| | MAA_pri[1:0] | Two bits of priority that accompanies each request. The arbiter implementation can optionally use none, one, or both bits. When used, the priority levels are as follows:<br>00-level 1 (lowest priority)<br>01-level 2<br>10-level 3<br>11-level 4 (highest priority) |
| Slave-Address Bus Arbiter and Masters (2 signals per slave) | SAAM_rcredit | Read address credit signal from the Slave to the Address Bus Arbiter and all Masters, one per slave |
| | SAAM_wcredit | Write address credit signal from the Slave to the Address Bus Arbiter and all Masters, one per slave |
| Address Bus Arbiter - Master (1 signal) | AAM_gnt | The grant signal going from the arbiter to every Master |

*Figure 7* B

| Source-Destination | Signal Name | Description |
|---|---|---|
| Master-Data Bus Arbiter (3 signals) | MDA_req | Request signal from each Master to the data bus arbiter |
| | MDA_pri[1:0] | Two bits of priority that accompanies each request. The arbiter implementation can optionally use none, one, or both bits |
| Slave-Data Bus Arbiter (3 signals) | SDA_req | Slave request line to the data bus arbiter |
| | SDA_pri[1:0] | Priority of a Slave's request to the data bus arbiter |
| Data Bus Arbiter-Master (1 signal) | DAM_gnt | Grant signal going from the data bus arbiter to each Master. |
| Data Bus Arbiter-Slave (1 signal) | DAS_gnt | Grant signal to each slave |
| Address Bus (61 signals for a 32-bit data bus, 65 signals for a 64-bit data bus, 74 for a 128-bit data bus) | AB_addr[33:0] | The 34 bits of address |
| | AB_slaveid[2:0] | Whether this is explicitly needed depends on the decision to implement memory-mapped bus id's. |
| | AB_trid[7:0] | Three bits of Master id and 5 bits of transaction id used to uniquely identify 32 transactions from each Master |
| | AB_cmd[4:0] | The transaction type. e.g., coherent/non-coherent; exclusive/non-exclusive; read/write; data transfer/probe |
| | AB_priority[1:0] | The same priority sent to the address bus arbiter when requesting the bus for a read operation. These bits are ignored by the receiving slave on a write address operation |
| | AB_bytemask[3:0] or AB_bytemask[7:0] or AB_bytemask[15:0] | One bit per byte of data on the data bus. A lest than bus width transaction must be masked because bytemask implies lower address bits. When all the bits are 0, this implies a full bus width transaction. When any of the bytemask bits are 1, the zero bits indicate the position and size of the data associated with the transaction. When streaming data, the size and position of data per cycle is restricted to a few limited number of possible bytemasks: the full width of the bus, the lower 32 bits, or the lower 64 bits. |
| | AB_valid | A one-bit signal on the bus to indicate that the bus is being actively driven on a particular cycle or not |
| | AB_size[3:0] | specifies the size of the transaction, or burst size from 1-16 cycles, with values from 0-15 |

Figure 7 continued C

| Source-Destination | Signal Name | Description |
|---|---|---|
| Data Bus (47 signals for a 32 bit bus, 79 signals for a 64 bit bus, or 151 signals for a 128 bit bus | DB_data[31:0] or DB_data [63:0] or DB_data{127:0] | The implementation allows a 32-bit, 64-bit or 128-bit wide data bus |
| | DB_trid[7:0] | The id of the transaction (returned by the Slave for a read data return) |
| | DB_order[3:0] | Specifies the order of data in the total 16 cycle count. This would be most commonly used to return critical data first for a cache line read |
| | DB_release | Used by a master on the bus to indicate that the bus has been released |
| | DB_endian | The endian-ness of the data on the bus. 0-little endian, 1-big endian |
| | DB_valid | A single bit signal on the bus to indicate that the bus is being actively drive on a particular cycle or not |
| Slaves (with caches) to the Memory Controller (7*2=14 signals, one per slave device) | COH_cstate[1:0] | The state of the cache line for the requested address 00-don't know yet 01-invalid 10-clean 11-dirty |
| Memory Controller to all Masters (1 signal) | COH_credit | When asserted, credits the coherency credit counters in all masters by one |

COHERENT DATA APPARATUS FOR AN ON-CHIP SPLIT TRANSACTION SYSTEM BUS

CROSS REFERENCE TO RELATED APPLICATIONS

This application is related to the following U.S. Patent applications, having a common filing date and a common assignee. Each of these applications is hereby incorporated by reference in its entirety for all purposes:

| Ser. No. | Title |
| --- | --- |
| 09/373,091 | SCALABLE ON-CHIP SYSTEM BUS |
| 09/373,092 | LOCKED READ/WRITE ON SEPARATE ADDRESS/DATA BUS USING WRITE BARRIER |
| 09/373,093 | DATA RELEASE TO REDUCE LATENCY IN ON-CHIP SYSTEM BUS |
| 09/373,095 | BURST-CONFIGURABLE DATA BUS |

FIELD OF THE INVENTION

This invention relates in general to the field of computer architecture, and more specifically to a data coherency mechanism for an on-chip split transaction system bus.

BACKGROUND OF THE INVENTION

A system bus in a computing system provides a communication channel between computing devices, such as microprocessors, graphics processors, direct-memory-access (DMA) controllers, and other devices such as memory, keyboard, monitor, video controllers, sound generation devices, etc. The system bus typically includes data paths for memory addresses, data, and control information. In some instances, a processor multiplexes (i.e., shares) address and data information over the same signal lines, albeit at different times. That is, a processor sends address information out over the address/data pins during a first time period and later uses the same address/data pins to send or receive data. Alternatively, many processors utilize separate signal lines for address and data information.

In operation, processors communicate with memory when they need to fetch instructions. During execution of instructions, processors might be required to read data from memory, or from another device such as an input/output (I/O) port. And, upon completion of instructions, processors might be required to write data to memory, or to another device. A typical scenario for accessing memory to obtain instructions and data is similar to the following:

1. A processor presents a memory address for an instruction on address lines of a system bus, and provides control information on control lines of the system bus to indicate that the operation is a read.
2. In response to the address and control information being placed on the system bus, memory places an instruction on data lines of the system bus, which are then read by the processor. The data is typically placed on the data lines N cycles after the address information has been placed on the address lines, where N is a positive integer and varies depending on the speed of the memory.
3. During execution of the instruction, if data is required, a memory address for the data is placed on the address lines of the system bus, and control information is placed on the control lines of the system bus to indicate a read.
4. Again, the memory places data corresponding to the memory address on the data lines of the system bus.
5. If the instruction needs to write to memory, the memory address for the write is placed on the address lines of the system bus, and control information is placed on the control lines to indicate a write.
6. N cycles after the memory address is presented, the data to be written is placed by the microprocessor on the data lines of the system bus. The memory uses the memory address presented in step 5, and places the data on the data lines into memory at that address.

One skilled in the art will appreciate from the above that the system bus provides the necessary physical interface between a processing device, and other devices (such as memory) that are external to it. A system bus also provides the protocol necessary for communicating between devices. That is, the protocol defines when address, data, and control signals must appear on the system bus, in relation to each other. For example, in the illustration presented above, address information appears in parallel with control information. At some time later, data information is presented by the processor, or is provided by memory.

In environments where there is only one device capable of initiating bus activity (a uni-master environment), the above described sequence is generally sufficient. However, in environments where multiple processors compete for access to shared devices, arbitration is needed to assign time on the bus to the multiple processors.

For example, if there are two processors on a system bus, both competing for access to slave devices (such as memory), typical systems provide an arbitration protocol between the devices to establish which one has the right to begin. On the Pentium bus (designed by Intel Corporation), a processor requests access to the bus by asserting a "bus request" signal. If the processor receives a "grant" signal, either from another processor, or from an external arbitration device, then it begins a transaction by placing address and control information on the bus. When it receives (or writes) data on the bus, it relinquishes control of the bus to the next processor. If another processor required access to the bus during the transaction, it would have to wait until the entire transaction (including the address and data portions of the transaction) completed. In most situations, it is undesirable to deny a processor access to a bus pending completion of an entire transaction by another processor.

One solution to this problem has been to separate the address and data bus portions of the system bus, and to provide separate arbitration for gaining access to each of the buses. For example, rather than requesting access (or master) of the system bus, a first processor may request access to the address bus. If the address bus is available, the first processor can present address information on the address lines, even though a second processor is bus master of the data bus. Access to the data bus by the first processor operates in a similar fashion.

Thus, by separating arbitration for accessing the address bus from that of the data bus, multiple masters are allowed to utilize portions of the system bus simultaneously. An example of an environment that provides for such split address and data buses is the system bus for the PowerPC 603, manufactured by Motorola.

When the address and data portions of a bus are separate, and are shared by multiple bus masters, a system is required to allow master devices to request, and gain access to the address and data buses, independently. This is typically provided via an arbiter, and an arbitration protocol.

The arbiter is coupled to each device on the bus that can act as a master device. A master that wishes to access either the address or data portions of the system bus presents a bus request (address bus request, or data bus request) to the arbiter. The arbiter, upon receipt of a request, utilizes its predefined protocol to determine when to grant the master access to either of the address or data bus. When it determines that the requesting master can access the address bus or the data bus, it provides that master with a bus grant signal (pertaining to the requested bus). Upon receipt of the grant signal, the requesting master begins driving the bus (address or data).

In multi-master environments, there are typically a number of locations where data may be stored. For example, it is common for a memory, or cache, to be placed within modern microprocessors to allow them to quickly access data or instructions without requiring that the processors access the memory on the system bus. Although the size of the cache is usually small compared to the memory on the system bus, every time a processor reads or writes data to a memory location that is already in its cache, activity on the system bus is reduced, or temporarily eliminated. An example of this is provided below using the split transaction bus described above.

1. If the data at address 1FFFH (where "H" stands for hexadecimal) is not in the cache, the master requests access to the address bus.
2. The arbiter grants the master access to the address bus.
3. The master asserts a read command, and places the address 1FFFH on the address bus.
4. When the memory controller is ready to respond to the read, it requests access to the data bus.
5. The arbiter grants the memory controller access to the data bus.
6. The memory controller places the data at address 1FFFH on the data bus.
7. The master receives the data.

If the data at memory address 1FFFH were already in the processor's cache, none of the above steps would have been necessary. Rather, the processor would have simply retrieved the data from its cache, without initiating any activity on the system bus. Thus, the use of caches by processors improve system performance, both by providing data/instructions immediately to requesting processors, and by reducing system bus activity.

However, when processors (or other devices) provide alternate locations where data/instructions may be stored, some coherency mechanism must exist to insure that the data/instructions in the alternate locations is either the same as the data/instructions in the main memory, or that all of the devices that access the main memory always obtain the latest or best copy of the data/instructions.

For example, suppose a processor reads data at memory address 2FFFH from the main memory and places a copy of this data in its cache. Future accesses by this processor to address 2FFFH may then be provided by the cache without requiring it to access the system bus. If a second processor requests data at memory address 2FFFH, it is acceptable to provide the data from the main memory, since no change has been made to the data. If however, prior to the second processor making the request, the first processor changes the data at address 2FFFH, the system must insure that the second processor is provided the new or changed data. The methodology that insures that all devices that access memory provide or obtain the latest or best data is known as "coherency". Although a complete description of coherency methodologies are beyond the scope of this application, an overview of a few well known methodologies are considered appropriate.

An early methodology that was developed required any processor making a change to data to "write-thru" the data all the way to main memory. That is, data could be copied into multiple caches on the system bus, and could be shared by multiple processors as long as the data remained unchanged. However, if any processor modified the data, it was required to write the data thru its own cache, and back out to main memory. Other processors on the system bus would "snoop" the write (by continuously examining the address bus), and would tag their copies of the data as "invalid". Subsequent accesses to the modified area of memory would require those processors to go back out to main memory to retrieve the latest data.

Since writes, or data modifications often occur in a processing environment, an improvement was made that required processors to "write-back" the modified data to the main memory, only if another device requested the modified data. For example, a processor might change data at address 3FFFH, and place the modified data in its cache. This modified data, rather than being written immediately to main memory, would be held in the cache and tagged as modified. The processor would continuously monitor the address/control lines of the system bus to determine whether another device requested data at 3FFFH. If so, the processor would cause the request to be held until it could write the modified data back into the main memory. Thus, until other processors requested the "modified" data, no activity was required on the system bus.

A number of different coherency systems have been developed which ensure data consistency. Such consistent systems track the state of data in caches depending on whether the data has been "modified" (or is "dirty"), and whether the data is "shared" by more than one device. However, the systems that have been developed thus far were designed for system buses that are off-chip. But as more devices are integrated on-chip, it is becoming increasingly important to develop coherency protocols that work in on-chip buses as well. Having on-chip coherency simplifies the task of software programmers that write embedded applications, since the hardware insures coherency between multiple instances of data/instructions.

Unlike off-chip coherency, on-chip coherency protocols can implement poin-to-point controls that can simplify the protocol and enable more efficient implementations. Another significant difference is that unlike off-chip buses that must maintain coherence between heavy-weight I/O devices that connect to the system bus, an on-chip bus can time the protocol for faster devices.

Furthermore, what is needed is an on-chip system bus that insures coherency for multiple instances of data where the system bus is implemented within a split transaction environment.

SUMMARY

The present invention provides an on-chip system bus having a plurality of data master devices that perform data transfers with memory. The master devices include a bus interface and a cache coherency system. The bus interface allows its master device to communicate with the on-chip system bus. The cache coherency system maintains coherency between a cache and the memory. The cache coherency system includes a coherency credit counter to count pending coherent operations on the bus. The coherency system also includes a coherency input buffer that is designated to hold coherent transactions. The bus interface communicates with a memory controller that includes coherency buffer management that manages coherent transactions initiated by the master devices.

In another aspect, the present invention provides a processing device configured to access an on-chip bus to perform a coherent data transfer. The processing device includes a bus interface and a cache coherency system. The bus interface couples the processing device to the on-chip bus. The cache coherency system is coupled to the bus interface, and determines whether the coherent data transfer can begin on the on-chip bus. The coherent data transfer is delayed until coherent transaction buffer space external to the processing devices is available. The processing device further includes split transaction tracking and control to establish a transaction ID for the coherent data transfer, the transfer having split address and data portions.

In yet another aspect, the present invention provides a multi-master split-transaction on-chip system bus for interfacing a number of master devices to a main memory, wherein each of the master devices have a bus interface. The master devices include a cache coherency system and split transaction tracking and control. The cache coherency system includes a cache to temporarily store data retrieved from the main memory. The coherency system insures that its master device does not operate on invalid data, and monitors a number of coherent data transactions. The split transaction tracking and control establishes transaction ID's for each of the number of coherent data transactions, where each of the transactions have split address and data portions.

Other features and advantages of the present invention will become apparent upon study of the remaining portions of the specification and drawings.

BRIEF DESCRIPTION OF THE DRAWINGS

FIG. 2 is related art timing diagram illustrating a memory read cycle through the bus interface of FIG. 1.

FIGS. 7A–C are a table illustrating the address, data, and control lines of the system bus according to the present invention.

DETAILED DESCRIPTION

The above background provided an overview of system buses, and described the need for providing coherency between multiple instances of data within a multi-master environment. The discussion below provides a more detailed overview of a related art system bus, in FIGS. 1 and 2, so that the reader will better understand the novel features of the present invention described with reference to FIGS. 3–9.

OVERVIEW OF A RELATED ART SYSTEM BUS

Figure 1:
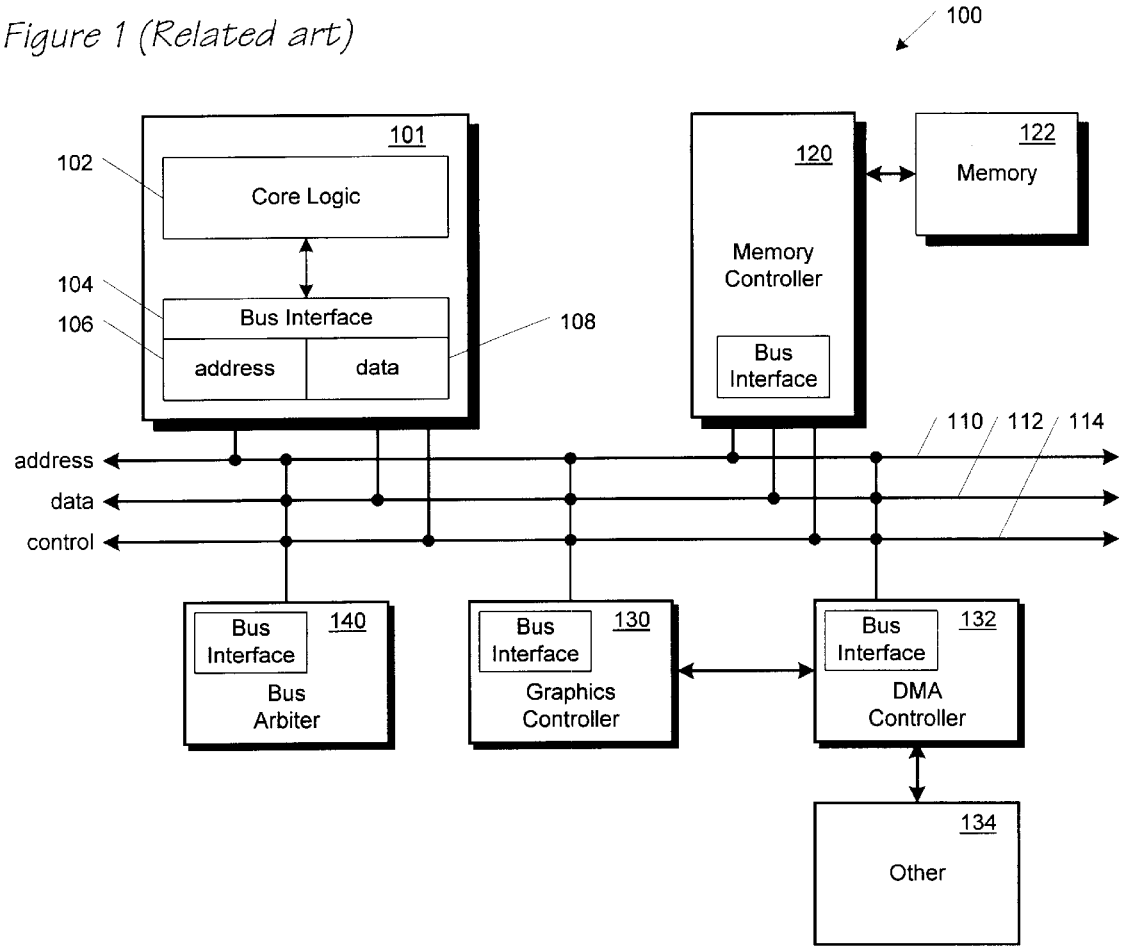
FIG. 1 is a block diagram of a related art multi-processing environment illustrating a processor connected through a bus interface to a memory controller, and other devices.

Referring to FIG. 1, a block diagram 100 of a related art computer system is shown. The computer system 100 includes a microprocessor 101 coupled to a memory 122 via a memory controller 120, via a system bus having separate address lines 110, data lines 112, and control lines 114. Also coupled to the system bus is a graphics controller 130, and a DMA controller 132, the DMA controller 132 coupling other device(s) 134 to the system bus. Finally, a bus arbiter 140 is shown, coupled to the system bus, to arbitrate access to both the address bus 110, and the data bus 112, between the competing bus master devices 101, 120, 130 and 132.

One skilled in the art will appreciate that the system bus of FIG. 1 may be either an on-chip or off-chip system bus depending on the solution required. In addition, the system bus as shown presents each device coupled directly to each of the address/data/control buses 110, 112, 114. The illustration of FIG. 1 is exemplary only. One skilled in the art understands that the separate buses 110, 112, 114 may connect to distinct devices, in a point-to-point fashion. The structure of the system bus in FIG. 1 simply provides a convenient illustration of how distinct devices communicate with one another over address/data/control lines.

Within the microprocessor 101 is a bus interface 104 with separate address 106 and data 108 portions, for interfacing the microprocessor 101 to the address and data lines 110, 112 of the system bus. The bus interface 104 is coupled to core logic 102 for executing instructions retrieved by the microprocessor 101.

In operation, when the microprocessor 101 wishes to communicate with an external device, such as the memory 120, or the I/O 132, the bus interface 104 is required to perform a bus cycle using the address, data, and control lines 110–114. During a bus cycle, the microprocessor 101 places an address corresponding to the target memory (or I/O) address on the address lines 110. In addition, the microprocessor 101 indicates the type of bus cycle it is initiating by placing a pattern on the control lines 114. Exemplary bus cycle types include reads and writes to memory or I/O. If the bus cycle type is a read, then N cycles after the memory 120 sees the target address on the address lines 110, and notices the bus cycle type from the control lines 114, the memory 120 will place the data stored at the target address on the data lines 112. The data portion 108 of the bus interface 104 will see the data on the data lines 112 and will latch the data for use by the core logic 102.

However, in a multi-master environment, where the address and data portions of a bus cycle are split, the processor 101 must first gain access to the address bus 110 by asserting "address bus request" to the arbiter 140. When the bus arbiter 140 asserts "address bus grant" to the processor 101, the processor 101 can drive the address onto the address bus 110 (and the control information onto the control bus 114). At some later time, the memory controller 120 provides the data associated with the request on the data bus 112. However, before the memory controller can begin driving the data, it must obtain mastership of the data bus. It does so by asserting "data bus request" to the arbiter 140. When the arbiter 140 asserts "data bus grant", the memory controller 120 can begin driving the data.

This is particularly illustrated in FIG. 2 to which attention is now directed. FIG. 2 provides a timing diagram 200 that illustrates a memory read bus cycle for the computing system 100 described above. A clock signal is shown that is the clock for the system bus. Addresses on address lines 110 are shown as an address signal. Data on data lines 112 are shown as a data signal.

In performing a memory read, the processor 101 asserts an address bus request during clock cycle 1. At clock cycle 2, the bus arbiter 140 sees the address bus request, and since the address bus is not currently busy, it asserts address bus grant at clock cycle 3. The processor 101 sees that the arbiter 140 has granted it mastership of the address bus 110 in clock cycle 4, and so, in clock cycle 5, drives the address associated with the bus cycle onto the address bus 110. The memory controller 120 sees the memory read in clock cycle 6, obtains the requested data, and asserts data bus request in clock cycle 7. The bus arbiter 140 sees the data bus request at clock cycle 8, and since the data bus is not currently busy, it asserts data bus grant in clock cycle 9. The memory controller 120 sees the data bus grant in clock cycle 10, and drives data onto the data bus 112 during clock cycle 11. The processor 101 sees the data on the data bus 112 and latches it into the data portion 108 of the bus interface 104. This completes the read bus cycle for the processor 101.

OVERVIEW OF THE OCS BUS

The discussion below describes novel aspects of the present invention as embodied within an On-Chip System (OCS) Bus. The OCS Bus is a scalable split-transaction bus for interfacing multiple masters in an on-chip environment.

The OCS Bus provides a synchronous interface to a de-multiplexed split transaction bus, having a 36-bit address bus, 4 to 16 bits of byte mask depending on the size of the data bus, and either a 32, 64 or 128-bit data bus. The arbitration for the address and data buses is independent, with the arbiter being central (one per bus). The arbiter considers all the incoming bus requests and decides a winner based upon the implemented algorithm. In the simplest instance, the arbiter does round robin scheduling of all the requesting masters. The complexity of the arbitration algorithm can vary depending on the performance requirements of the system. The buses and arbiter logic are pipelined, so the arbiter can be granting the bus to the next requester, while the previous winner is using the bus.

The data portion of the OCS bus supports burst transactions for devices with bursting traffic or higher bandwidth requirements. The address bus inherently only supports single cycle transactions, with the exception of locked read-modify-write operations. The protocol also allows the last-use master to park on the bus, for both buses, while there are no other requesters.

Although the description below will illustrate a particular embodiment of the OCS Bus, one skilled in the art will appreciate that the novel aspects of the present invention are applicable to other bus designs, and should not be restricted to the particular embodiment described.

Figure 3:
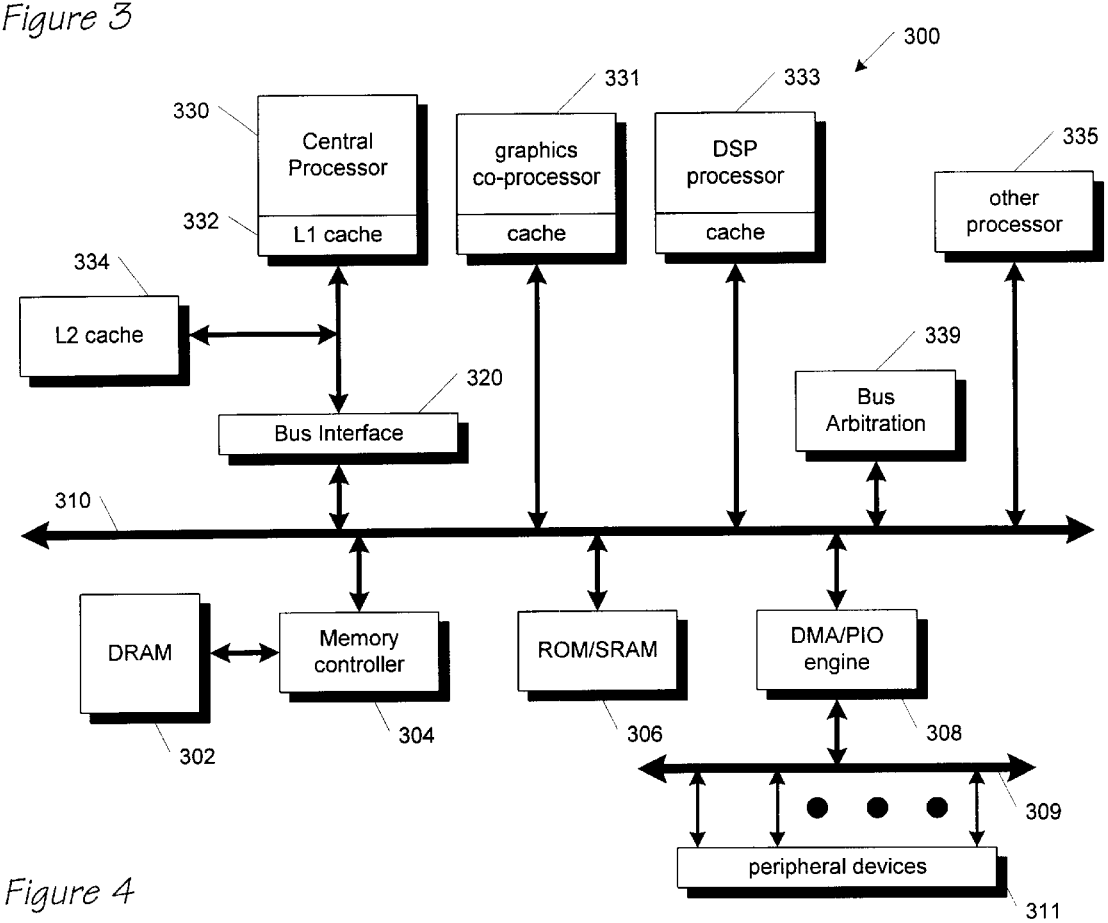
FIG. 3 is a block diagram of an on-chip system bus according to the present invention, particularly illustrating a multiple master/slave environment.

Referring to FIG. 3, a block diagram 300 is provided illustrating a number of on-chip processing devices in communication with each other via a system bus 310. More specifically, a central processor 330 (having an L1 cache 332) is coupled to the system bus 310 via a bus interface 320. Between the bus interface 320 and the central processor 330 is an L2 cache 334. To illustrate that the on-chip system bus 310 is a multi-master bus, other master devices are shown including: a graphics co-processor 331 (having a cache), a DSP processor 333 (having a cache), and another processor 335. Furthermore, a number of slave devices are shown attached to the system bus 310 including: DRAM 302 attached via a memory controller 304; ROM/SRAM 306; and a direct memory access (DMA)/programmable input output (PIO) engine 308 for coupling peripheral I/O devices 311 to the system bus 310 via a peripheral bus 309. Operationally, any of the master devices 330, 331, 333, 335 can communicate with the memory controller 304, ROM/SRAM 306 or the DMA/PIO engine 308 via the system bus 310, albeit at different times. In addition, the master devices 330, 331, 333, and 335 may have resources within them (such as a cache) that may be accessed by the other master devices. That is, a device may be a master device for some transactions and a slave device for other transactions.

Finally, coupled to the system bus 310 is bus arbitration logic 339. The bus arbitration logic is responsible for receiving bus master requests for either the address bus or the data bus, and for providing bus grant signals to the requesters according to a predetermined arbitration algorithm. The protocol for requesting mastership of the address and data buses will be further described below. First however, a detailed description will be provided for the split-transaction logic that is embodied within the on-chip OCS bus, according to the present invention, so that the reader will better understand the novelty of the coherency mechanism described below with reference to FIG. 6.

SPLIT TRANSACTIONS

The computing environment described above in FIG. 1 required the processor 101 to wait until the data portion of the bus cycle completed before it was allowed to issue another read request. To eliminate this wait, the system bus 310 of the present invention provides a split transaction bus. That is, the master devices do not have to wait for a request to be completed before issuing a new request. Rather, the masters, on the address/control lines of the system bus 310, are allowed to make requests before the data portions associated with their requests complete. In addition, the masters receive and process requests even when they are waiting on completion of prior requests. This is accomplished by separating the request and the reply portions of transactions. By de-coupling the request portion of a transaction, from the reply portion of the transaction, latencies typically associated with waiting on the reply portion to complete are eliminated.

However, since multiple requests can be pending on the system bus 310 at any one time, a means is required to identify data replies back to their corresponding requests, if out-of-order returns are to be permitted. To satisfy this requirement a master tags each request that is made on the system bus 310 when it issues. When a data response is ready, a slave device sends the tag back to the requesting master with the data. For Write requests, the writing master sends the written data with the same tag it used when it issued the Write control. Furthermore if multiple masters are placed on the system bus 310, a portion of the tag is used to identify the requesting device.

Figure 5:
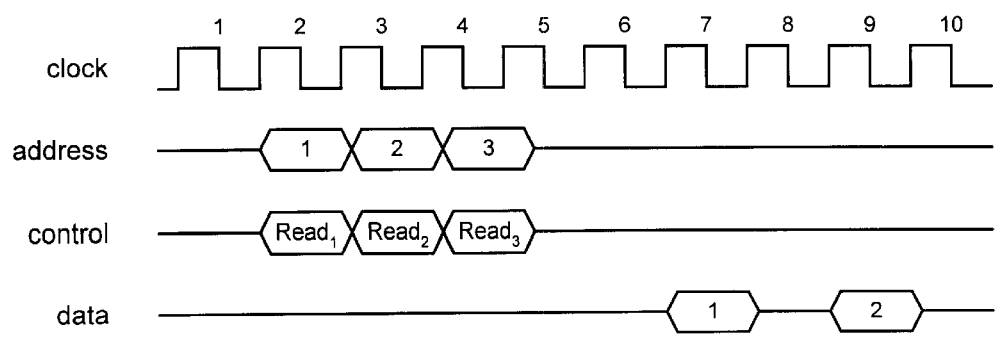
FIG. 5 is a timing diagram illustrating use of the split transaction tracking and control on the on-chip system bus of the present invention.
Figure 4:
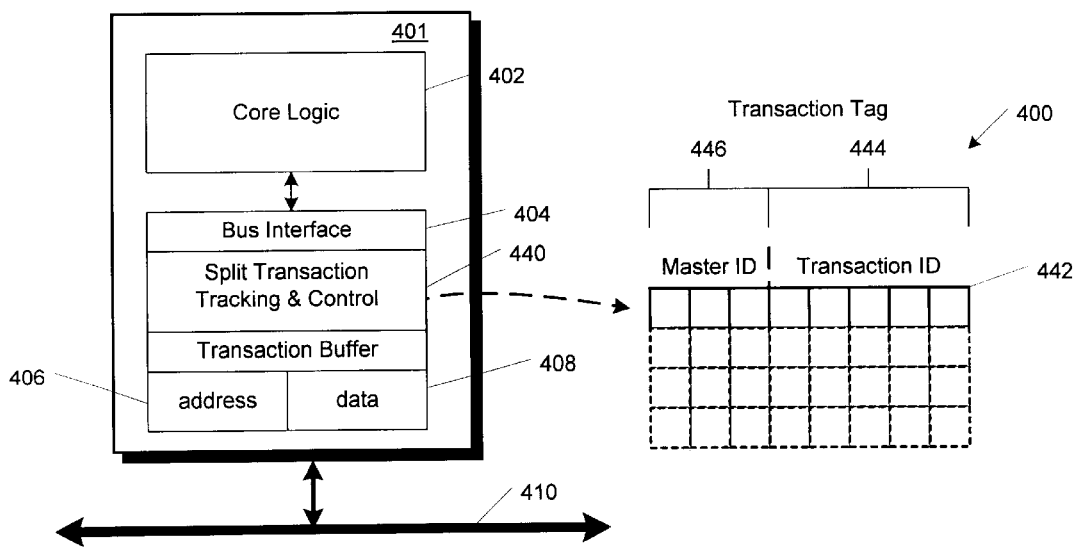
FIG. 4 is a block diagram of a processing device incorporating split transaction tracking and control for interfacing to the on-chip system bus.

Access to the address and data portions of the OCS bus are eliminated from the discussion in FIGS. 4 and 5 so that the reader can better understand the function of the split-transaction aspects of the present invention.

Referring to FIG. 4, a block diagram 400 is provided of a microprocessor 401 incorporating aspects of the present invention. Elements similar to those described in FIG. 1 above are shown with the same reference numbers, the hundreds digit being replaced with a 4.

Additionally, the processor 401 includes split transaction tracking & control 440 coupled to the core logic 402 and the bus interface 404. In one environment, the split transaction tracking and control 440 is embodied within the bus interface 404 within the processor 401, although this is not a requirement. Within the split transaction logic 440 is at least one transaction buffer 442. The buffer 442 provides temporary storage for transactions awaiting response. The transaction id's are 8-bits in width: a 5-bit transaction ID 444 and a 3-bit master device ID 446. By using a 5-bit transaction ID 444, as many as 32 outstanding requests may exist on the system bus 410 (with a transaction buffer of up to 32 entries). In addition, by using a 3-bit master device ID 446, as many as 8 different master devices may be indicated. If an implementation supports all 32 requests, the transaction buffer 442 may be implemented with a 32 entry table (i.e., one entry per outstanding transaction).

In operation, as each request is made by the processor 401, a target address is placed on address lines of the system bus 410. Note: particular definitions of each of the lines on the system bus 410 are provided below with reference to FIG. 9.

As part of the request, the split transaction tracking and control 440 provides a transaction ID that is associated with the request. In one embodiment, this id is generated by concatenating the current requester's id with the index of the transaction buffer entry that will hold the request until a response is returned. The transaction ID is then placed on the ID control lines (described further below) of the system bus 410.

When a reply is presented on the data lines of the system bus 410, the transaction ID associated with the request is placed on the data ID lines of the system bus 410. Thus, the device replying to the request must be designed to provide the transaction ID to the system bus 410 along with the data. To better understand how splitting the request and reply portions of a bus cycle reduces the wait described above, attention is directed to FIG. 5.

In FIG. 5, a timing diagram 500 is provided illustrating split transaction requests/replies. During clock cycle 1, request 1 is placed on the control lines of the system bus 410 to indicate a read. In addition, the split transaction tracking & control 440 places a transaction ID of 1, for example, on the ID lines of the system bus 410. At the same time, the address portion 406 of the bus interface 404 places the target address associated with the request on the address lines of the system bus 410. At the end of clock cycle 1, the address and control lines of the system bus 410 are free to perform another transaction. This is true even though the reply associated with request 1 has not completed. Thus, in comparison with FIG. 2, the processor does not have to wait 6–8 cycles before beginning another request. Rather, the processor 401 can immediately make another request, if needed.

As shown in FIG. 5, the processor 401 makes 3 back to back requests. Beginning in clock cycle 2, the processor 401 issues request 2 on the control lines of the system bus 410. In addition, the split transaction tracking & control 440 provides a transaction ID of 2 to the bus interface, which is presented on the ID lines of the system bus 410. At the end of clock cycle 2, the address and control lines are free to perform another request.

So, in clock cycle 3, the processor 401 issues request 3 on the control lines of the system bus 410. The split transaction and control 440 provides a transaction ID of 3 to be presented on the ID lines of the system bus 410. The target address associated with request 3 is also presented on the address lines of the system bus 410. At the end of clock cycle 3, the address and control lines are free to perform another transaction.

During clock cycle 6, data associated with request 1 is placed on the data lines of the system bus 410. The data is being provided by memory external to the processor 401, or by the slave device responsible for the data. In addition, the transaction ID associated with request 1 is placed on the data ID lines of the system bus 410 to identify the data with its associated transaction. At this point, the bus interface 404 of the processor 401 detects the data, and its associated transaction ID. Since the transaction ID indicates the master device ID, the processor 401 knows that it is the requester. So, the processor 401 latches the data in the data portion 408 of the bus interface 404. The transaction tag is then provided to the split transaction & control 440. The split transaction & control 440 is then responsible for associating the data according to the target address of request 1. At the end of clock cycle 6, the data lines are free to be used by another device on the OCS bus 410.

During clock cycle 8, data associated with request 2 is placed on the data lines of the system bus. Again, along with the data, its associated transaction tag is placed on the ID lines of the system bus. The processor recognizes that it was the requester of the data, and latches the data in the data portion 408 of the bus interface 404. The split transaction & control 440 is then responsible for associating the data according to the target address of request 2.

What has been described above with respect to FIGS. 4 and 5 is a means for separating the request and reply portions of a bus cycle to allow multiple requests to be made, without regard to latencies associated with replies. In the embodiment shown, all of the concurrent requests were memory read requests (as opposed to memory writes, or I/O reads/writes). However, one skilled in the art will appreciate that the nature of the request does not affect the advantages of the split transaction bus. In addition, what has been described are concurrent requests made by a single processor 401. It should also be appreciated that multiple processors can exist on the system bus 410 each having their own device ID.

Furthermore, as hinted at in the background above, if a master device requests data that is already present within its cache, activity on the system bus may be eliminated. That is, if the processor 401 contains a cache, and a read is initiated to an area of memory that resides in the cache, the read is provided entirely within the processor 401 without requiring that the processor request mastership of the address bus, etc.

ADDRESS BUS PROTOCOL

When a master wants to use the address bus, it sends a request signal to the address bus arbiter. The arbiter grants the bus based on its arbitration algorithm. The master asserts the lock signal when it wants the address bus for two consecutive cycles (r–w). Besides these, the master's bus interface sends three other pieces of information to the address bus arbiter: the transaction type MAA_type[1:0], the target slave id MAA_slaveid[2:0] of the prospective transaction, and the priority of the transaction MAA_pri [1:0]. Depending on the complexity of the arbiter, it may or may not choose to use this information. The transaction type and slave id would be used by an arbiter in a system that wants to minimize wasted cycles on the bus. That is, the arbiter also maintains a set of credit counters for the slaves, and checks credit status before granting the request from a master targeted to a particular slave for a specific transaction type. With this type of arbitration, the arbiter must be designed to prevent starvation and to be fair. For more information on the credit counters used, the reader is directed to U.S. Ser. No. 09/373,091, entitled "SCALABLE ON-CHIP BUS".

The priority bits are used if the arbiter implements a priority based arbitration algorithm, such as round robin arbitration at different priority levels. The two bits of priority allow the implementation of 4 priority levels. The simplest arbiter could ignore the priority bits and assume that all requests are at the same level and implement a round robin algorithm among all the masters. A more complex arbiter might implement two priority levels and hence ignore one of the two priority bits, and implement round robin among the two levels. That is, as long as there are requests at the higher priority level, they are granted and requests at the lower priority level must wait until there are no requests pending at the higher level. A configuration bit (not shown) in each bus interface specifies the number of priority levels that the arbiter in the current implementation will accept.

The address bus consists of 65 signals (for a 64-bit data bus). These include AB_addr[33:0] for the address. The lower 2 bits of the address are not needed since the data bus width is 8 bytes and byte addresses are used on the bus. One mask bit per data byte provides the data byte mask, with an 8-bit byte mask for 8 data bytes (or 16 bytes wide with 16 bits of bytemask, or 4 bytes wide with 4 bits of bytemask). This system uses 34 bits to address a 36-bit wide address. Other systems may use wider addresses. In such systems, this expanded addressing capability can be accommodated by simply expanding the width of the address lines.

Since the bus architecture supports a maximum of eight drops, three bits AB_slaveid[2:0] are sufficient to address the slave device. The transaction id AB_trid[7:0] consists of 3 bits of master id to uniquely specify the master that originated the transaction, and 5 bits of transaction id, to uniquely track up to 32 outstanding transactions from a specific master.

The AB_bytemask field is used to indicate the position and size of data on the 8 byte wide data bus (assuming a 64-bit data bus, 8 bits of byte mask are required). If all the AB_bytemask bits are zero, this implies a full data bus width transaction. If any of these bits are not zero, then the position and number of the zero bits indicate the position and size of the data in the total width. A transaction is said to stream data when a single address is used to transmit more than one cycle of data on the data bus. When streaming data, not all bytemask values are valid.

DATA BUS PROTOCOL

A generator of data (a source) uses the data bus to transmit the data to a sink, who accepts the data. The basic data bus protocol is a little different from the address bus protocol. The main differences are: the explicit use of a release signal by a source to relinquish the data bus (described further below); multi-cycle burst transactions; and no separate flow control for data bus transactions. Rather, the flow control of data bus transactions are implicitly tied to address transactions. A slave configuration register (discussed above in FIG. 7) holds the length of bursts supported by a slave per address transaction for write operations. A master must guarantee buffer space for read-return data from a slave. For a more complete description of the configuration register, please see U.S. Ser. No. 09/373,095, entitled "BURST CONFIGURABLE DATA BUS", which is hereby incorporated by reference.

The initial steps of the request-grant-data-release protocol sequence works as it did for the address bus. That is, when a source wants to use the bus it asserts a request signal MDA_req to the data bus arbiter. The arbiter grants the request DAM_gnt two cycles or later. Two cycles after the source sees grant, it begins to use the data bus. Once the source obtains the data bus, it can continue to use it until the arbiter takes away grant. After the arbiter takes away grant, the source can continue to hold the data bus until it completes its current transaction. During its last cycle of use of the data bus, the source asserts the release signal DB_release. This implies that the data bus is available for use by another source two cycles after the release signal. The cycle after release is the bus turn around cycle. When other sources are requesting the bus, the arbiter asserts grant for a cycle and deasserts it while asserting it to the next source. The second source cannot use the data bus until it sees the release signal from the current source on the bus. The arbiter needs to keep the grant signal asserted at the second source until the first source releases the bus.

COHERENCY SYSTEM

NON-COHERENT OPERATIONS

The table below illustrates the operation of the OCS bus for non-coherent operations.

| AB_cmd [4:0] | Operation Name | Operation of devices with a Cache | Operation of the memory controller |
|---|---|---|---|
| 001 | Write-barrier (non-coherent) | Do nothing | The slave that is the target of this transaction treats this write as a barrier and does not allow any other transaction to the same address (from any Master), to bypass this write. |
| 010 | Reserved | | |
| 011 | Reserved | | |
| 100 | Read (non-coherent) | If target (slave id match), returns data directly from cache to initiator. | If target (slave id match), returns data directly from memory to initiator. |
| 101 | Write (non-coherent) | If target (slave id match), writes data directly into cache. | If target, write data directly into memory |
| 110 | Interrupt | If target, set/reset some interrupt register on device | |
| 111 | Idle | Do nothing. | Do nothing. |
| 01000 | Read-impl | Implementation specific type of read, if required | |
| 01001 | Write-impl | Implementation specific type of write, if required | |
| 01010 | Reserved | | |
| 01011 | Error | Encode error-type in the low two bits of AB_bytemask field, i.e., AB-bytemask [1:0] 00 - Master error 01 - Slave error 10 - Address-bus arbiter error 11 - Data bus arbiter error Encode id of error device for Master and Slave in AB_slaveid | |
| 01100 | EJTAG | | |
| 01101 | | | |
| 01110 | | | |
| 01111 | | | |

The basic non-coherent operations are Read, Write, Interrupt, and Idle. These are used with the designated slave id field in the address bus, i.e., the specific targeted slave responds to the operation. In the case of Idle, no slave responds. The Idle operation is used when a master has acquired the address bus, but is unable to use it because of flow control or other reasons. The interrupt operation is used to set or reset an interrupt register in a specific target device designated by the slave id field. The Read and Write are non-coherent read and write operations.

The Write-barrier is used by a master in a Read-Modify-Write atomic transaction. A separate write command type is used by the slave to understand that the master intends this write to act as a barrier and to ensure that all operations to the same address from all masters do not bypass this write. For a complete description of Write-barrier, please see U.S. Ser. No. 09/373,092 entitled "LOCKED READ/WRITE ON SEPARATE ADDRESS/DATA BUS USING WRITE BARRIER".

The Read-impl and Write-impl are provided as slots where implementation specific read and write operations can be used.

When one of the devices on the bus times out without getting a response to a request, or the arbiter notes that some device is not responding, the reset signal is asserted and the entire bus interface unit resets all its state. The error signaling operations are used to designate the possible source of error in the system before pulling reset, so a record can be made by a bus monitoring device of the possible source of problems in the system.

COHERENT OPERATIONS

The table below illustrates the operation of the OCS bus for coherent operations. Designations are as follows: d-dirty, c-clean, i-invalid, s-shared, e-exclusive, as possible cache states, and wb for writeback.

| AB_cmd [4:0] | Operation Name | Operation of devices with a Cache | Operation of the memory controller |
|---|---|---|---|
| 10000 | Writeback-downgrade | If [d], wb and modify to [s] | Put wb data if any into memory, also picked up by the initiator. If no wb, ack initiator with a coherent-ack operation on the address bus (after all cache devices have responded). |
| 001 | Writeback-invalidate | If [d], wb and if [c or d] modify to [i] | Put wb data if any into memory, also picked up by initiator. And if none, ack initiator after all devices have responded. |
| 010 | Coherent-ack | Do nothing | The memory controller initiates this to indicate the completion of a coherent operation to the initiator when no data writeback was done (which would have been used by the initiator as an ack otherwise). |
| 011 | Reserved | | |
| 100 | Read-non-exclusive ([s] in initiator's cache) | If [d], wb and modify [e] to [s] | Put wb data if any into memory, also picked up by the initiator. If no wb data, read data from memory and send to initiator. |
| 101 | Reserved | | |
| 110 | Reserved | | |
| 111 | Reserved | | |
| 11000 | Read-exclusive-probe ([c] in initiator's cache) | If [d], wb and if [c or d], modify to [i] | This is used when the initiator knows it is going to write the whole line into its cache, so there is no need to send data. But the initiator does not have the cache line, so it allocates a cache line for the data in [e] mode (with wb data if it exists or with junk value). If no wb data, memory controller acks the initiator when all other devices have responded. |
| 11001 | Upgrade-probe ([e] in initiator's cache) | If [d], wb (shouldn't happen) and if [c or d], modify to [i] | The difference between this and read-exclusive-probe is that in this case, the data already exists in the initiator's cache in [s] mode and it wants to upgrade to [e]. When all devices have responded, ack the initiator. |
| 11010 | Reserved | | |
| 11011 | Reserved | | |
| 11100 | Read-exclusive | If [d], wb and if [c or d], modify to [i] | Wait for all devices to respond and if wb the initiator picks up the data. If no wb, read memory and send back data to initiator. |
| 11101 | Write-exclusive | If [d], wb and if [c or d], modify to [i] | (Used when initiator does partial cache-line write and wants the memory controller to merge this with the rest of the dirty data). Merge write data from initiator with wb data and write into memory. IN this case the initiator does not pick up wb data. |
| 11110 | Reserved | | |
| 11111 | Reserved | | |

Figure 6:
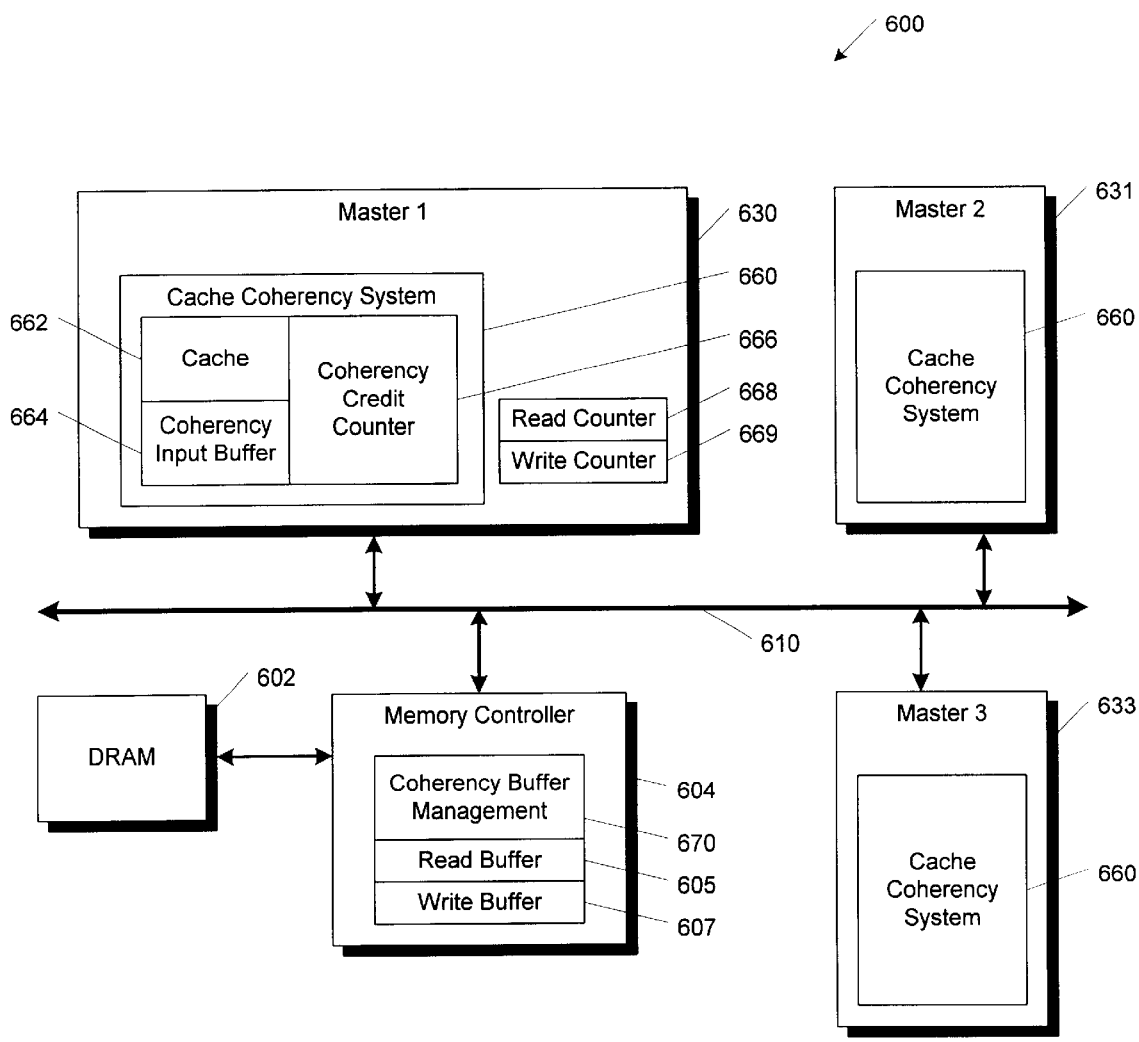
FIG. 6 is a block diagram of multi-master system bus having a cache coherency system according to the present invention.

The two tables for the non-coherent and coherent commands on the OCS bus shows an embodiment with a specific encoding for the commands. It is appreciated that other encodings are applicable and can be used without changing the underlying operations on the bus. Referring now to FIG. 6, a block diagram 600 is provided of a multi-master environment incorporating the cache coherency mechanism of the present invention. Three master devices 630, 631 and 633 are shown coupled to a memory controller 604 via the OCS bus 610. The memory controller 604 couples the main memory (DRAM) 602 to all of the devices on the OCS bus 610. Within each of the master devices, a cache coherency system 660 is provided. Details of the cache coherency system 660 are illustrated with particular reference to master device 630.

Within the cache coherency system 660 are a cache 662 a coherency input buffer 664, and a coherency credit counter 666. External to the coherency system 6 60 are a read counter 668 and a write counter 669. The read counter 668 and the write counter 669 are part of the credit based flow control system mentioned above with respect to the Address Bus Protocol. As referenced in that section, for more information on the credit based flow control used in the OCS bus, the reader is directed to U.S. Ser. No. 09/373,091, entitled "SCALABLE ON-CHIP SYSTEM BUS."

The OCS bus protocol requires that all systems using coherent operations implement their devices with caches with a pre-designated coherency input buffer 664 to hold only coherent transactions. The size of the buffer 664 must be built to suit the performance requirements of the system configuration in question, provided the size is identical for all devices 630, 631, 633.

In addition, the coherency credit counter 666 is added to all master interface blocks for coherent operations. The credit counter 666 must be checked by the master 630 before initiating a coherent operation. In addition, the initiator of coherent operations must also check the memory controller's 604 read address buffer counter 668 (assuming that the memory controller does not implement a separate coherent-operations-only buffer). The coherency operation credit counters are decremented whenever a coherent operation is initiated on the bus, and it is incremented when an explicit credit signal is asserted by the coherency buffer management logic 670 of the memory controller (which acts as the designated central controller of all coherency operations). In addition, if a write-back operation is possible from a cache with dirty data, the memory controller's 604 write address counter 669 must also be checked.

On the OCS bus, responses to all coherent transactions are channeled via the memory controller 604. Each device with a cache sends two bits of state signal to the memory controller 604 in response to a coherent operation. The two bits of state are dirty, clean, invalid, or don't-know-yet. The don't-know-yet is used to indicate that the device is still busy and unable to read out its cache state. Since these two bits of state are a side-band communication and do not carry any transaction id information, each device must respond to coherent operations in the order received.

The coherent-ack operation is used by the memory controller 604 to acknowledge the completion of a probe coherent operation that has no data return associated with it. When a coherent operation has a data return associated with it, the data itself acts as an acknowledgement of the completion of the operation.

The general flow of coherency operations are as follows:
1. A master 630, 631, 633 that wishes to initiate a coherent operation checks the coherency credit counter 666 for positive credit. In addition, it checks the read and write address (for write-back data) counters 668, 669 for the memory controller 604. When all these counters indicate available resources, the master can put out its request, for example a writeback-invalidate operation.
2. All devices with caches verify the type of operation and enter it into their coherency input buffer 664. (If the operation is coherent, the target slave id is ignored). The operation is also recorded by the memory controller 604, which is going to co-ordinate all the responses and send an acknowledgement back to the original initiator, if needed.
3. All devices (with caches), respond to the memory controller 604 with their state, i.e., dirty, clean, invalid, or don't-know-yet. If a particular device responds with dirty, that device will follow up with the dirty data on the data portion of the OCS bus 610. On the data portion, it uses the transaction id used by the original initiator. Except in the case of Write-exclusive, the initiator is able to pick up the writeback data. A device response with either clean or invalid is accepted by the memory controller 604 without the expectation of any other communication. A response of don't-know-yet implies that the device is still busy and unable to check its status. In this situation, the memory controller 604 must wait until the device can respond.
4. Once all the devices have responded, the memory controller can respond to the original initiator acknowledging that the Writeback-invalidate operation is complete. This acknowledge is needed only if there was no dirty writeback data. To do this, the memory controller 604 uses an address bus operation with the originator's transaction id and the operation Coherent-ack, which is a non-coherent operation that requires no checking of credit counters by the memory controller before sending on the address bus.

OCS BUS INTERFACE SIGNALS

Referring to FIG. 7, a table 700 is shown that illustrates Address, Data and Control signals according to the OCS bus of the present invention. This Figure shows: 17 signal lines for address bus arbitration (plus 2 credit/debit signals per slave); 8 signal lines for data bus arbitration (plus additional signals for each master in a system); 61–74 address bus signals (depending on the size of the data bus); 47–151 signals for data bus signals (depending on the size of the data bus); and 3 signal lines for coherency.

The OCS bus interface illustrated in table 700 is partitioned into three sub-interfaces, each of which operates independently from the others. The OCS bus interface 604 consists of separately controlled Address, Data and Coherence interfaces. The address and the data interfaces are independent, and each can be in either a master or slave state at any time regardless of the state of the other.

In address master state, the master drives the bi-directional address interface signals and is permitted to issue master requests to the OCS bus. In slave state, the master does not drive the bi-directional address interface signals and accepts external requests from the OCS bus.

In data master state, the master drives the bi-directional data interface signals and is permitted to send write-back, store or response data to the OCS bus. In slave state, the master does not drive the bi-directional data interface signals and accepts data responses from the OCS bus.

The coherence interface does not have any bi-directional signals. It is always in master state and driven by the master.

READ REQUEST PROTOCOL

Having described the on-chip system bus for the present invention, the split transaction capability of the bus, and the coherency mechanism implemented to allow multi-master operation, an example of a read operation will now be presented that illustrates the bus interface in operation. The flow of a typical read operation is:
1. The Master that wants to read, requests the address bus arbiter for the address bus. It signals the id of the target slave, a priority, and the type of operation, i.e., Read. In addition, if the Read is a coherent operation, the master checks the coherency credit counter, and the read/write counters for the memory controller for positive credit.
2. The arbiter issues a grant to the requesting Master. This grant is based on whether the Master has received its turn in the arbitration scheme per its priority level. On receiving grant, the Master can drop its request line, or keep it asserted if it has another request that it needs to make.

3. The Master puts the read address out on the address bus. If the transaction is a coherent read, all the devices with a cache respond to the memory controller with their state, as described above.

4. When the Slave is ready with the read data, it requests the data bus from the data bus arbiter along with a priority. It uses the same priority bits that it obtained from the master during the address transaction.

5. The data bus arbiter grants the data bus to the slave per the arbitration logic.

6. The Slave puts the first 8 bytes of data out on the data bus when it has seen Release and has grant. As mentioned above, if the transaction is a coherent read, it is possible that the master would obtain the data earlier, such as when another master device is writing back dirty data. In this instance, the memory controller 604 would not present the requested data subsequent to the writeback.

Figure 8:
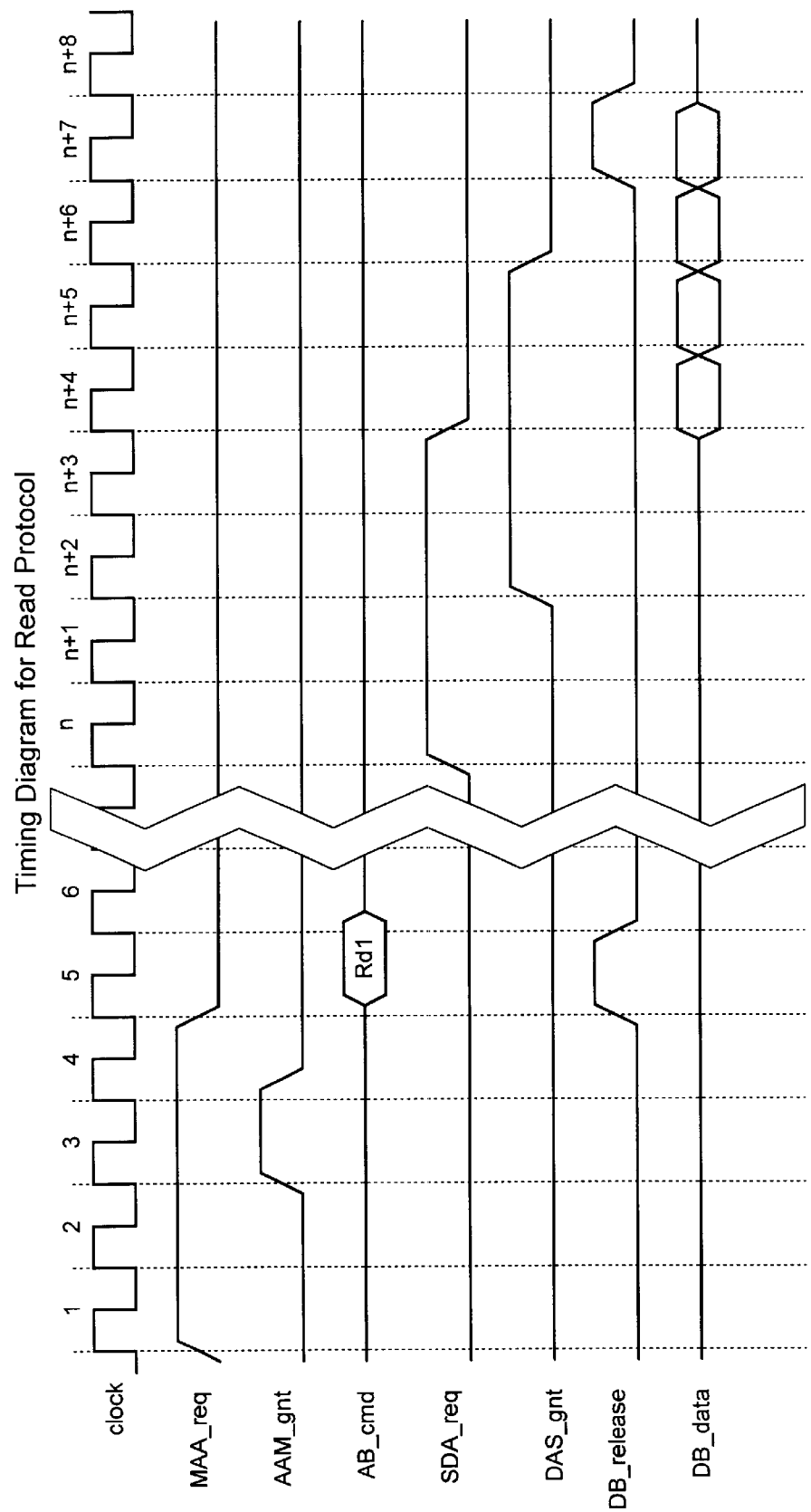
FIG. 8 is a timing diagram illustrating the read protocol of the split-transaction on-chip system bus with data release according to the present invention.

Referring to FIG. 8, a timing diagram 800 is presented illustrating the read protocol on the OCS bus. The control signals in FIG. 8 are presented as active HIGH. A read is shown to begin when a processor requests access to the address bus by asserting MAA_req at clock cycle 1.

At clock cycle 3, the arbiter grants the processor access to the address bus by asserting AAM_gnt.

At clock cycle 5 (2 clock cycles after seeing grant) the processor initiates a read by indicating a read command on AB_cmd. While not shown, it should be understood that the processor also presents the address of the read on the address lines of the OCS bus. Also shown at clock cycle 5 is the data release line DB_release. This indicates that another device that is responding to a previous request is completing the request and releasing the data bus. In addition, the processor P0 becomes master of the address bus, and drives a read command Rd1 on the command lines. In addition, the processor P0 drives the address associated with Rd1 on the address lines of the OCS bus, and places the transaction ID associated with the request on SysCmdID.

At clock cycle n, the slave device, that is the target of the read, requests access to the data bus by asserting SDA_req.

At clock cycle n+2, the arbiter grants the slave access to the data bus by asserting DAS_gnt. Note, since the data bus is inactive when the slave requested access, grant is asserted two clock cycles after the request is made.

At clock cycle n+4, the slave device begins driving data on the data bus. In this illustration, the slave device requires 4 clock cycles to fulfill the read request, and performs the request in a 4 cycle burst. In this instance the slave device was able to begin transferring data 2 cycles after seeing assertion of DAS_gnt since it had already recorded assertion of DB_release in clock cycle 5.

At clock cycle n+8, commensurate with the last clock cycle of data transfer, the slave device asserts DB_release indicating that it no longer requires access to the data bus.

OCS Bus Summary

Figure 9:
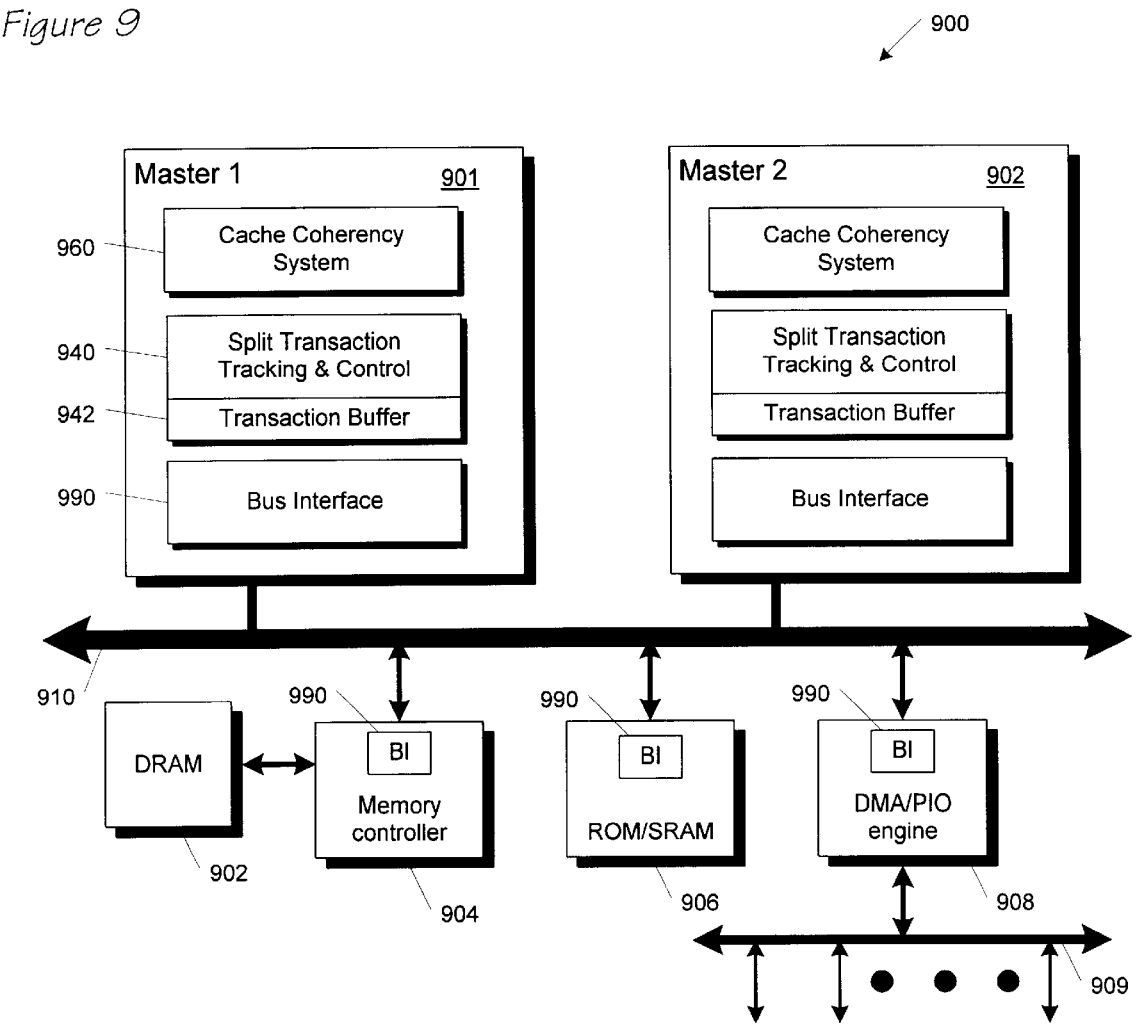
FIG. 9 is a block diagram illustrating master devices incorporating split transaction control and cache coherency interfacing to the on-chip system bus of the present invention.

Referring now to FIG. 9, a block diagram 900 is shown of processors 901, 902 that incorporate the novel bus features of the present invention. The processors 901, 902 are coupled to other devices 904, 906, and 908, through a bus interface 990 via a system bus 910. The processors 901, 902 each have a split transaction tracking and control 940 with a transaction ID register 942. In addition, the processors include a cache coherency system 960. Each of the elements shown in FIG. 900 operate as described above with reference to FIGS. 4–6.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer languages (RTL), Verilog HDL, VHDL, AHDL (Altera Hardware Description Language), or other programming and/or circuit (i.e., schematic) capture tools available in the art. A book entitled "A Verilog HDL Primer" by J. Bhasker, Star Galaxy Pr., 1997 provides greater detail on Verilog HDL, and is incorporated herein by reference in its entirety for all purposes.

It is understood that the functions accomplished by the invention as described above could be represented in a core which could be utilized in programming code and transformed to hardware as part of the production of integrated circuits. Also, other implementations of the invention using a combination of hardware and software are also possible. Therefore, the embodiments expressed above are within the scope of the invention and should also be considered protected by this patent.

In addition, elements of the OCS bus of the present invention have been described both separately, and together. These include: split-transactions, transaction ID's, cache coherency, etc. Applicants anticipate that these novel features may be combined in a variety of ways, depending on the needs of the computing environment into which the OCS bus will be used.

Furthermore, the bus of the present invention has been particularly described with reference to a master processor and a slave. However, one skilled in the art will appreciate that any type of device, whether slave or master (or both slave and master), that requires on-chip access to other devices, may be designed to incorporate the novel features of the present invention by providing an interface to the OCS bus as described above.

Finally, the cache coherency mechanism is particularly described, in combination with coherency buffer management within the memory controller. However, one skilled in the art should appreciate that the coherency buffer management may be placed in another device, or may be eliminated altogether if point to point routing between master devices is desired.

The bus of the present invention has been particularly described with reference to an on-chip bus. One skilled in the art should appreciate however, that the novel aspects of the bus, as described above, may be implemented either partially, or entirely off chip, without departing from the solution provided by the present invention.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An on-chip system bus having a plurality of data master devices that perform data transfers with memory, each of the master devices comprising:

a bus interface, for allowing its master device to communicate with the on-chip system bus; and a cache coherency system having a cache, coupled to said bus interface, for maintaining coherency between said cache and the memory, wherein said cache coherency system comprises a coherency credit counter, for counting pending coherent operations on the system bus.

2. The on-chip system bus, as recited in claim 1 wherein the on-chip system bus is a split-transaction bus.

3. The on-chip system bus, as recited in claim 1 wherein a data master device is a device capable of initiating a data transfer on the system bus.

4. The on-chip system bus, as recited in claim 1 wherein a bus arbiter is configured to arbitrate between the plurality of data master devices for access to the system bus.

5. The on-chip system bus, as recited in claim 1 wherein the data transfers are in response to a read command occurring on the system bus.

6. The on-chip system bus, as recited in claim 1 wherein said bus interface comprises an address portion and a data portion.

7. The on-chip system bus, as recited in claim 1 wherein said cache coherency system insures that two or more of the plurality of data master devices can have the same data in a consistent state in their caches.

8. The on-chip system bus, as recited in claim 1 wherein if one of the plurality of data master devices modifies datum in its cache, said cache coherency system within another one of the plurality of data master devices invalidates said datum in its cache.

9. The on-chip system bus, as recited in claim 1 wherein if one of the plurality of data master devices modifies datum in its cache, the one of the plurality of data master devices changes a state of said datum in its cache to dirty.

10. The on-chip system bus, as recited in claim 9 wherein if another one of the plurality of data master devices attempts to read said datum, the one of the plurality of data master devices writes back said dirty datum to the memory prior to the other one of the plurality of data master devices reading said datum.

11. The on-chip system bus, as recited in claim 10 wherein the one of the plurality of data master devices changes the state of said datum in its cache to shared.

12. The on-chip system bus, as recited in claim 1 wherein if one of the plurality of master devices contains datum in its cache, and said datum has a state of exclusive, and another one of the plurality of master devices attempts to read said datum from the memory, the one of the plurality of master devices changes the state of said datum in its cache to shared.

13. The on-chip system bus, as recited in claim 1 wherein if one of the plurality of master devices contains datum in its cache, and said datum has a state of clean or dirty, and another one of the plurality of master devices initiates a read exclusive probe associated with said datum, the one of the plurality of master devices changes the state of said datum in its cache to invalid.

14. The on-chip system bus, as recited in claim 13 wherein if said state of said datum in the one of the plurality of master devices is dirty, upon recognizing said read exclusive probe, the one of the plurality of master devices causes said dirty datum to be written back to the memory.

15. The on-chip system bus, as recited in claim 1 wherein if one of the plurality of master devices contains datum in its cache, and said datum has a state of clean or dirty, and another one of the plurality of master devices initiates an upgrade-probe associated with said datum, the one of the plurality of master devices changes the state of said datum in its cache to invalid.

16. The on-chip system bus, as recited in claim 1 wherein if one of the plurality of master devices contains datum in its cache, and said datum has a state of clean or dirty, and another one of the plurality of master devices initiates a write-exclusive associated with said datum, the one of the plurality of master devices changes the state of said datum in its cache to invalid.

17. The on-chip system bus, as recited in claim 16, wherein if said datum in the one of the plurality of master devices is dirty, the one of the plurality of master devices writes back said datum to the memory.

18. The on-chip system bus, as recited in claim 1 wherein said cache coherency system insures that the plurality of data master devices do not use invalid data values.

19. The on-chip system bus, as recited in claim 1 wherein said coherency credit counter is coupled to a memory controller having coherency buffer management, said coherency credit counter monitoring available buffer space in said coherency buffer management.

20. The on-chip system bus, as recited in claim 19 wherein if said coherency credit counter determines that there is no available buffer space in said coherency buffer management, said cache coherency system causes its master device to delay coherent transactions until said coherency credit counter determines that there is available buffer space in said coherency buffer management.

21. The on-chip system bus, as recited in claim 1 wherein said cache coherency system further comprises:

a coherency input buffer, coupled to said coherency credit counter, said coherency input buffer designated to hold coherent transactions.

22. The on-chip system bus, as recited in claim 21 wherein the size of said coherency input buffer is the same for all of the plurality of data master devices.

23. The on-chip system bus, as recited in claim 1 further comprising:

a memory controller, coupled to the system bus, said memory controller having coherency buffer management, said coherency buffer management managing all coherent transactions initiated by the plurality of data master devices.

24. The on-chip system bus, as recited in claim 23 wherein said coherency buffer management, upon recognition of a coherent transaction initiated by one of the plurality of data master devices, delays servicing of said coherent transaction by said memory controller until it receives coherency state information from the other of the plurality of data master devices.

25. The on-chip system bus, as recited in claim 24 wherein said coherency buffer management, upon receiving said coherency state information from the other of the plurality of data master devices, alerts said memory controller to retrieve datum associated with said coherent transaction.

26. The on-chip system bus, as recited in claim 24 wherein said coherency state information comprises:

dirty, clean, invalid, or don't-know-yet states.

27. A processing device configured to access an on-chip bus to perform a coherent data transfer, the processing device comprising:

a bus interface, for coupling the processing device to the on-chip bus; and a cache coherency system having a cache, coupled to said bus interface, for determining whether the coherent data transfer can begin on the on-chip bus;

wherein the coherent data transfer cannot begin on the on-chip bus if coherent transaction buffer space external to the processing device is unavailable.

28. The processing device, as recited in claim 27 wherein said coherent transaction buffer space is located within a memory controller that is coupled to the on-chip bus.

29. The processing device, as recited in claim 27 wherein said cache coherency system comprises a coherency credit counter for monitoring the availability of said coherent transaction buffer space.

30. A processing device configured to access an on-chip bus to perform a coherent data transfer, the processing device comprising:

a bus interface, for coupling the processing device to the on-chip bus;

a cache coherency system having a cache, coupled to said bus interface, for determining whether the coherent data transfer can begin on the on-chip bus; and split transaction tracking and control, coupled to said bus interface, for establishing a transaction ID for the coherent data transfer, wherein said transfer has split address and data portions.

31. The processing device as recited in claim 30 wherein said split transaction tracking and control comprises:

a transaction buffer, for temporarily storing said transaction ID so that it may be presented along with said coherent data transfer on the on-chip bus.

32. The processing device as recited in claim 30 wherein said transaction ID comprises:

a device ID, for identifying a device that initiates said coherent data transfer; and a transaction tag, for identifying said coherent data transfer.

33. A multi-master split-transaction on-chip system bus for interfacing a plurality of master devices to a main memory, wherein each of the plurality of master devices have a bus interface, each of the plurality of master devices comprising:

a cache coherency system, having a cache, coupled to the bus interface, for temporarily storing data retrieved from the main memory, for insuring that its master device does not operate on invalid data, and for monitoring a plurality of coherent data transactions; and split transaction tracking and control, coupled to the bus interface, for establishing transaction ID's for each of the plurality of coherent data transactions, wherein said transactions have split address and data portions.

34. The multi-master split-transaction on-chip system bus as recited in claim 33 wherein said cache coherency system comprises:

a coherency credit counter, for tracking the number of pending coherent data transactions; and a coherency input buffer, coupled to said cache, said coherency input buffer designated to hold the plurality of coherent data transactions.

35. The multi-master split-transaction on-chip system bus as recited in claim 33 wherein said split transaction tracking and control comprises:

means for generating a transaction tag that may be presented along with said address portion of the plurality of coherent data transactions.

36. A computer program product for use with a computing device, the computer program product comprising:

a computer usable medium having computer readable program code embodied in said medium for causing an on-chip computing bus to be described, said computer readable program code comprising:

first computer readable program code for providing a cache coherency system within a master device, to maintain data coherency between a cache and a main memory for coherent data transactions; and second computer readable program code for providing split transaction tracking and control to establish transaction ID's for said coherent data transactions to be presented on the on-chip computing bus, wherein said transactions have split address and data portions.

37. A method for performing a coherent data transfer on an on-chip bus, comprising:

providing a processing device to access the on-chip bus;

monitoring availability of a coherent transaction buffer space external to the processing device; and determining whether the coherent data transfer can begin on the on-chip bus based on the availability of the coherent transaction buffer space.

38. The method as recited in claim 37 further comprising:

delaying the coherent data transfer if said step of determining determines that the coherent transaction buffer space is unavailable.

39. The method as recited in claim 37 further comprising:

beginning the coherent data transfer if said step of determining determines that the coherent transaction buffer space is available.

* * * * *